United States Patent [19]
Colburn

[11] 3,843,060
[45] Oct. 22, 1974

[54] RECLAMATION OF FABRIC SUPPORTED THERMO-PLASTIC SHEET SCRAP

[75] Inventor: James R. Colburn, Columbus, Miss.

[73] Assignee: The General Tire & Rubber Company, Akron, Ohio

[22] Filed: June 20, 1973

[21] Appl. No.: 371,786

[52] U.S. Cl.................... 241/24, 264/37, 264/118
[51] Int. Cl............................................ B02c 19/12
[58] Field of Search ............... 241/4, 24, 79, 79.1; 264/11 B, 121, 37, 126

[56] References Cited
UNITED STATES PATENTS
1,484,208  2/1924  Davis.................................... 241/4
3,562,373  2/1971  Logrippo ...................... 264/121 X Primary Examiner—Granville Y. Custer, Jr.

[57] ABSTRACT

Thermoplastic chips are produced from sheet scrap, the sheet including a layer of thermoplastic resin and a fabric backing attached thereto. The sheet is granulated into a first particulate mixture of thermoplastic chips, chopped fabric, lint and fly. That mixture is then fed into a cyclone where a major portion of the lint and fly is separated and drawn off from the first mixture leaving a second particulate mixture primarily comprising thermoplastic chips and chopped fabric. This second mixture is then fed into a specific gravity air separator wherein an air stream (1) separates substantially all of the chopped fabric from the thermoplastic chips, and (2) conveys the chopped fabric out of the air separator while the heavier thermoplastic chips fall through the air stream and are removed from the air separator, yielding essentially fiber-free thermoplastic chips, usable with or instead of virgin thermoplastic resin.

14 Claims, 2 Drawing Figures

RECLAMATION OF FABRIC SUPPORTED THERMO-PLASTIC SHEET SCRAP

BACKGROUND OF THE DISCLOSURE

This invention relates to the manufacture of thermoplastic resin sheet material such as vinyl coated fabrics, expanded vinyl sheet and other plastic roll goods. More particularly, the invention relates to the reclaiming or reprocessing of scrap material produced in the manufacture of various plastic roll goods, especially scrap that contains reinforcing textile fabric.

Enormous amounts of scrap are generated during the manufacture of textile fabric reinforced (or supported) thermoplastic resin sheet material. This scrap includes, for example, selvedge trim — strips trimmed from the sides of a long sheet to eliminate edge irregularities and to provide the desired lateral dimension. This scrap is difficult to dispose of and usually requires the services of an industrial waste contractor. This service is costly, particularly because space for such disposal is increasingly difficult to find.

While thermoplastic sheet material that has no textile fabric reinforcement may be readily reprocessed merely by mixing the scrap with virgin material and processing it according to standard practices, these same techniques cannot be readily adapted to scrap from reinforced sheet because of the fabric backing. The woven fibers prevent the material from banding on a mill and thus it cannot be calendered.

Among the known methods for reclaiming fabric-supported thermoplastic sheet scrap is that described in pending U.S. Pat. application, Ser. No. 310,503, assigned to the present assignee. The method described therein involves the application of shearing forces parallel to the surface of segments of the scrap, so that the fabric fibers are ruptured and torn into short lengths but are not removed from the mixture. A different approach is taken in the method described in U.S. Pat. No. 3,562,373, issued to Logrippo. This method involves chopping the scrap into a mixture of vinyl, fabric, lint and fly, and heating the mixture to a viscous consistency. The viscous mixture is then permitted to cool, after which the solid mass is broken into chunks, which are then chopped into small pellets of vinyl and fiber. The major disadvantage of both of these methods is the presence in the end product of at least a substantial amount of the fabric originally present in the scrap. These fibers make it difficult to calender the mixture because the calendered stock has a tendency to tear as it comes off the last roll, as the fibers present in the stock cause it to have very little tensile strength unless the stock is quite thick (at least about one fourth inch). It is equally difficult to use such material to extrude relatively thin sections, and for the same reason.

SUMMARY OF THE INVENTION

Accordingly, it is an object of the present invention to provide a method for reclaiming fabric-supported thermoplastic sheet scrap, especially vinyl, in which the product is substantially fiber-free thermoplastic chips.

It is another object of the present invention to provide a reclamation process which eliminates the need for disposal of most of the scrap produced during the manufacture of fabric-supported thermoplastic sheet.

These and other objects of the present invention are accomplished by the provision of a method of producing thermoplastic resin chips from a sheet, including a layer of thermoplastic resin and a fabric backing attached thereto. The method comprises:

a. chopping the sheet into a first particulate mixture of thermoplastic chips, chopped fabric, lint and fly;

b. separating a major portion of the lint and fly from said first particulate mixture, leaving a second particulate mixture comprising primarily thermoplastic chips and chopped fabric;

c. separating substantially all of the chopped fabric from the thermoplastic chips by means of a moving stream of air; and, d. conveying the chopped fabric away from the thermoplastic chips while the heavier thermoplastic chips fall through said stream of air and are collected, yielding a mixture of essentially fiber-free thermoplastic chips, usable with or instead of virgin thermoplastic material.

DESCRIPTION OF THE PREFERRED EMBODIMENT

Figure 1:
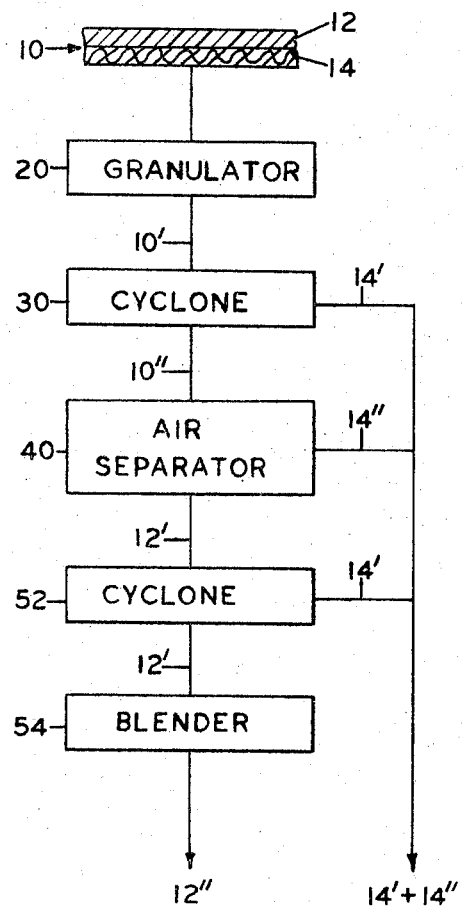
FIG. 1 is a flow diagram of the essential steps of the present invention.

Referring now to the drawings, and especially FIG. 1, there is shown a typical piece of supported thermoplastic sheet 10, including a layer of thermoplastic material 12, supported by a sheet of fabric 14. The sheet 10 is normally manufactured by pressing the support fabric 14 into the hot thermoplastic material 12 just prior to its being cooled so that the fabric 14 is embedded in, and adheres to the back side of the thermoplastic material. Conventionally, the thermoplastic sheet includes compounds such as thermoplastic resins which have been treated with a compatible plasticizer, and in some cases, a blowing or forming agent. The support fabric 14 normally used in conjunction with the thermoplastic sheet 12 is a cotton or synthetic, either knitted or woven.

While the present invention can be used in connection with many types of thermoplastic sheets, its use in connection with supported polyvinyl chloride sheet appears to be the most advantageous at the present time. The types of vinyl products that can be made from the scrap produced in the manufacture of supported PVC sheets include matting of all types, automobile carpet underlay, substrates for vinyl coatings, boat decking, Landau sheeting, wall coverings, upholstery material and embossed sheeting for many applications.

Figure 2:
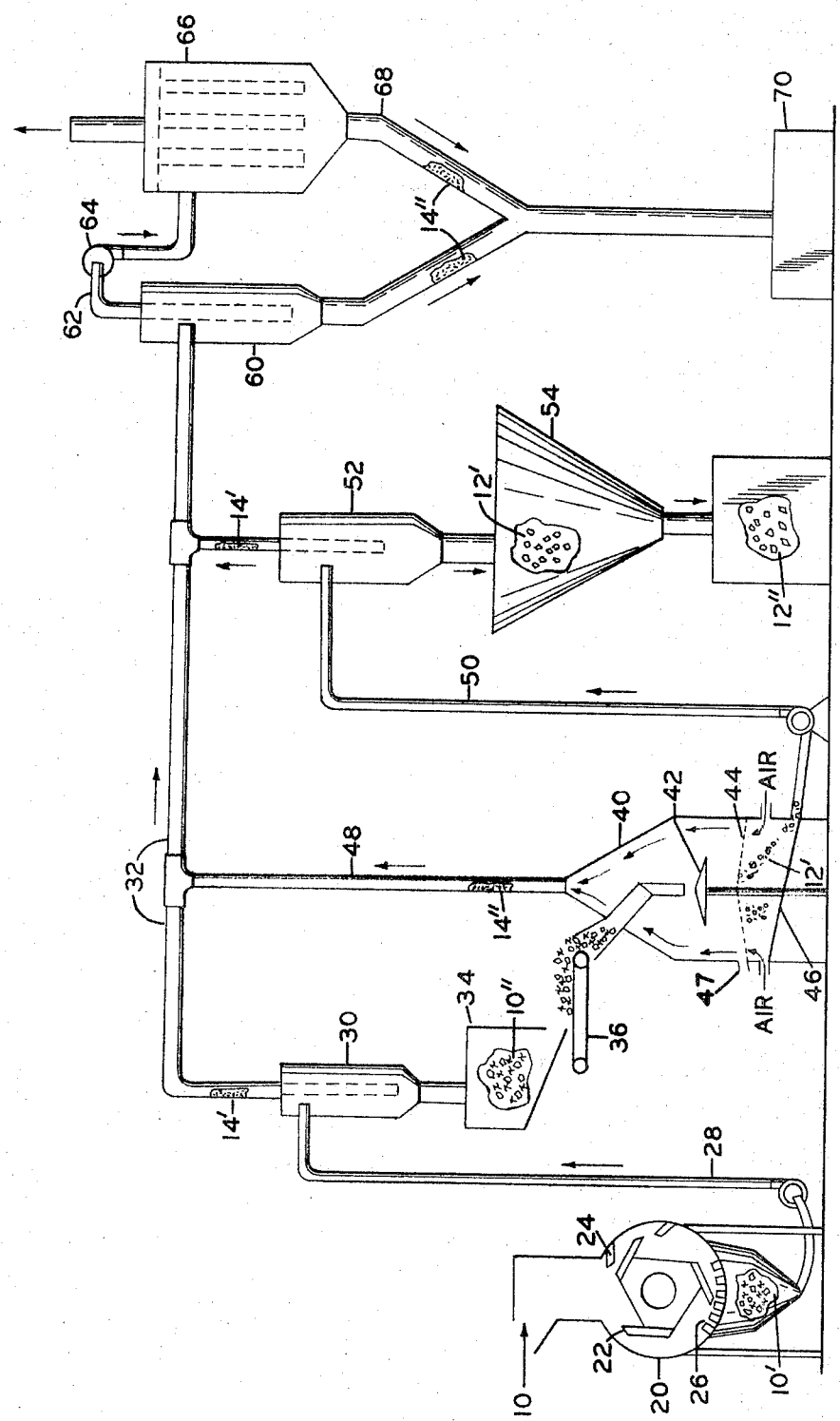
FIG. 2 is a fragmentary semi-schematic diagram of the apparatus used to practice the method of the present invention.

Referring again to the drawings, FIG. 1 shows by means of a flow chart the steps of the preferred method, while FIG. 2 is a fragmentary, semi-schematic representation of the apparatus used to practice the present invention. In the Figures, the materials being processed are designated, at the various processing stages, by like numerals. The supported thermoplastic sheet scrap 10 is first fed into a granulator 20 in which the scrap is chopped into a particulate mixture 10', which includes chopped thermoplastic chips, chopped fabric, lint and fly. In this context, it should be recognized that the term "chopping" includes cutting by any means, but a granulator of the type shown is preferred.

As an example, in the subject embodiment a Model 13-CSD granulator sold commercially by Mitts & Merrill was used. The granulator 20 includes a plurality of rotating cutting blades 22 which interact with mating stationary blades 24 to chop the supported sheet. In the bottom of the main portion of the granulator 20 is a screen 26 having openings small enough to permit the passage therethrough of only the particles which are as small as desired, in this case, from one sixteenth to three sixteenths inch and preferrably about one-eighth inch (from 1.59 millimeters (mm) to 4.77 millimeters (mm), and preferably about 3.18 millimeters (mm).) The particulate mixture 10' is transported by pneumatic conveying means 28 to a first cyclone separator 30, in which a major portion of the lint and fly 14' are separated and drawn off from the first particulate mixture 10', leaving a second particulate mixture 10", which primarily comprises chopped fabric and thermoplastic chips. As used herein, "fly" is fine lint and the term "cyclone" or "cyclone separator" means and includes any and all of the devices commonly referred to by such term in connection with the art of removing materials from an airstream. The airstream and lint and fly 14' are removed from the cyclone 30 through the duct 32, which projects down into the cyclone. At the bottom of the conical portion of the cyclone 30 is a rotary valve (not shown), which serves as an air lock permitting the chopped particles of thermoplastic and fiber to be removed from the airstream and subsequently passed into the feed hopper 34, which is preferably included to control the feed rate of the particulate mixture 10" onto the belt feeder 36 and subsequently, into the specific gravity air separator 40.

A typical specific gravity air separator, such as the one available commercially from Bauer Bros. Co. as Model No. 208-5B, is shown in FIG. 2. It includes a rotating distribution deck 42, onto which the incoming mixture 10" is fed for uniform distribution about the air separator. As the material is distributed by the deck 42, it falls downward toward the screen 44, which may be a perforated deck or a screen, allowing air to flow upwardly through the screen 44 toward the top of the air separator 40. This upward air current (arrows) separates the mixture 10" into a low specific gravity component (chopped fabric 14"), and a higher specific gravity component (thermoplastic chips 12'). The acceptable chips 12' (fiber free) pass through the screen 44 and out a discharge chute 46. Oversized particles with fabric still attached slide over the screen 44 and out discharge chute 47. At this point, the acceptable product 12' being removed from the bottom of the air separator may not be immediately-reusable chips, but may include some chopped fabric. The chopped fabric 14", which is removed through the top of the air separator 40, passes by means of duct 48 until it joins the lint and fly 14' in the airstream passing through duct 32.

The substantially fiber-free thermoplastic chips 12' then pass from the discharge spout 46 by means of a pneumatic conveying duct 50 to a second cyclone separator 52, similar to the first cyclone 30, in which the chips 12' are removed from the airstream in much the same way that the mixture 10" was removed from the air-stream by passing through a rotary valve positioned at the bottom of the cyclone 52. From the cyclone 52 is removed additional fine lint and fly 14' which is conveyed upward until it joins with the airstream in horizontal duct 32. The substantially fiber-free thermoplastic chips 12', after passing from the cyclone 52, are fed into a blender 54, if not all of the chips 12' are the same color, so that the final mixture of thermoplastic chips 12" is of a homogeneous color throughout. As the chips 12" pass from the blender 54, they may be collected in some sort of container 56, after which they may be utilized for charging an extruder, a mold, or for making sheetlike stock on a calender.

After the thermoplastic chips 12" have been segregated, it may also be desirable to separate the material being carried by the airstream in duct 32. For this purpose, a third cyclone separator 60 may be employed, removing the dust and very fine lint from the cyclone separator 60 by way of a duct 62, while permitting the fibers and heavier lint and dust to pass through the rotary valve at the bottom of the cyclone separator 60. The exhaust fan 64 then feeds the dust-containing airstream into a bag-type dust collector 66, where the final stage of separation of dust and fibers occurs, with any fibers passing from the dust collector 66, by means of a duct 68, into a baler 70 in which substantially all of the chopped fibers and heavier lint is collected for disposal.

The invention has been described in great detail sufficient to enable one of ordinary skill in the art to make and use the same. Obviously, modifications and alterations of the preferred embodiments will occur to others upon a reading and understanding of the specification and it is my intention to include all such modifications and alterations as part of my invention insofar as they come within the scope of the appended claims.

What is claimed is:

1. A method of producing thermoplastic chips being of essentially fiber-free thermoplastic material from a sheet including a layer of thermoplastic material having a fabric backing attached thereto, the method comprising:
   a. chopping the sheet into a first particulate mixture comprising respectively said thermoplastic chips, chopped fabric, lint and fly;
   b. separating a major portion of said lint and fly from said first particulate mixture, leaving a second particulate mixture comprising primarily said thermoplastic chips and said chopped fabric;
   c. separating substantially all of said chopped fabric from said thermoplastic chips by means of a moving stream of air; and
   d. conveying said chopped fabric away from said thermoplastic chips, said thermoplastic chips being heavier and falling through said stream of air to be collected, thereby yielding a mass of said thermoplastic chips usable with and instead of virgin thermoplastic material.

2. The method of claim 1 wherein the step of chopping comprises granulating the sheet in a chopping type granulator means including a screen having openings from about one-sixteenth to about three-sixteenths inches (about 1.59 mm to about 4.77 mm).

3. The method of claim 1 wherein the separating of step (b) is accomplished by means of an air stream carrying said first particulate mixture and moving in a vortex pattern such that said second particulate mixture is removed from the bottom of said vortex pattern.

4. The method of claim 1 wherein the separating of step (b) is accomplished by means of a cyclone separator.

5. The method of claim 1 wherein said step of conveying is accomplished by said moving stream of air moving in a generally upward direction.

6. The method of claim 1 wherein steps (c) and (d) are performed by means of a specific gravity air separator, said moving stream of air moving generally upward.

7. The method of claim 2 wherein the separating of step (b) is accomplished by means of an air stream carrying said first particulate mixture and moving in a vortex pattern such that said second particulate mixture is removed from the bottom of said vortex pattern.

8. The method of claim 7 wherein said step of conveying is accomplished by said moving stream of air moving in a generally upward direction.

9. The method of claim 8 wherein the separating of step (b) is accomplished by means of a cyclone separator.

10. The method of claim 9 wherein steps (c) and (d) are performed by means of a specific gravity air separator, said moving stream of air moving generally upward.

11. Apparatus for producing thermoplastic chips being of essentially fiber-free thermoplastic material from a sheet including a layer of thermoplastic material having a fabric backing attached thereto, comprising:

a. means for chopping the sheet into a first particulate mixture comprising respectively said thermoplastic chips, chopped fabric, lint and fly;

b. means for separating a major portion of said lint and fly from said first particulate mixture to leave a second particulate mixture comprising primarily said thermoplastic chips and said chopped fabric;

c. means for separating substantially all of said chopped fabric from said thermoplastic chips including means for moving a stream of air; and d. means for conveying said chopped fabric away from said thermoplastic chips with said thermoplastic chips being heavier and falling through said stream of air to be collected, such apparatus thereby yielding a mass of said thermoplastic chips usable with and instead of virgin thermoplastic material.

12. The apparatus of calim 11 wherein the means for chopping comprises a chopping type granulator means including a screen having openings from about one-sixteenth to about three-sixteenths inches (about 1.59 mm to about 4.77 mm).

13. The apparatus of claim 11 wherein the means for separating comprises a cyclone separator.

14. The apparatus of claim 11 wherein said means for separating (of (c)) and said means for conveying (of (d) includes a separator having said moving stream of air moving generally upward.

* * * * *